US008340975B1

(12) United States Patent
Rosenberger

(10) Patent No.: US 8,340,975 B1
(45) Date of Patent: Dec. 25, 2012

(54) INTERACTIVE SPEECH RECOGNITION DEVICE AND SYSTEM FOR HANDS-FREE BUILDING CONTROL

(76) Inventor: Theodore Alfred Rosenberger, Allentown, PA (US)

(*) Notice: Subject to any disclaimer, the term of this patent is extended or adjusted under 35 U.S.C. 154(b) by 17 days.

(21) Appl. No.: 13/252,849

(22) Filed: Oct. 4, 2011

(51) Int. Cl.
*G10L 11/00* (2006.01)
*G10L 21/00* (2006.01)
*G10L 21/06* (2006.01)

(52) U.S. Cl. ............... 704/275; 704/270; 704/270.1; 704/271; 704/272; 704/273; 704/274

(58) Field of Classification Search ........... 704/270–275
See application file for complete search history.

(56) References Cited

U.S. PATENT DOCUMENTS

| 5,086,385 | A  | * | 2/1992  | Launey et al. ............... 700/83 |
| 5,109,222 | A  | * | 4/1992  | Welty ..................... 340/12.28 |
| 6,188,986 | B1 | * | 2/2001  | Matulich et al. ............ 704/275 |
| 6,219,645 | B1 | * | 4/2001  | Byers ........................ 704/275 |
| 6,324,514 | B2 | * | 11/2001 | Matulich et al. ............ 704/275 |
| 6,397,186 | B1 | * | 5/2002  | Bush et al. .................. 704/274 |
| 6,513,006 | B2 | * | 1/2003  | Howard et al. .............. 704/257 |
| 6,580,950 | B1 | * | 6/2003  | Johnson et al. ............... 700/17 |
| 6,584,439 | B1 | * | 6/2003  | Geilhufe et al. ............ 704/270 |
| 6,735,619 | B1 | * | 5/2004  | Sawada ...................... 709/212 |
| 6,813,221 | B1 | * | 11/2004 | Barr .......................... 367/198 |
| 6,859,776 | B1 | * | 2/2005  | Cohen et al. ................ 704/270 |
| 6,889,189 | B2 | * | 5/2005  | Boman et al. ............... 704/270 |
| 6,988,070 | B2 | * | 1/2006  | Kawasaki et al. ........... 704/275 |
| 7,006,006 | B2 | * | 2/2006  | Witkow et al. .............. 340/4.41 |
| 7,031,920 | B2 | * | 4/2006  | Dowling et al. ............. 704/270 |
| 7,043,429 | B2 | * | 5/2006  | Chang et al. ................ 704/236 |
| 7,228,275 | B1 | * | 6/2007  | Endo et al. .................. 704/235 |
| 7,418,392 | B1 | * | 8/2008  | Mozer et al. ................ 704/275 |
| 7,464,035 | B2 | * | 12/2008 | Funk et al. .................. 704/275 |
| 7,747,446 | B2 | * | 6/2010  | Blass et al. .................. 704/275 |
| 7,765,033 | B2 | * | 7/2010  | Perry ......................... 700/275 |
| 7,769,591 | B2 | * | 8/2010  | White et al. ................. 704/270 |
| 7,774,204 | B2 | * | 8/2010  | Mozer et al. ................ 704/275 |
| 7,881,939 | B2 | * | 2/2011  | Tice ........................... 704/271 |
| 7,904,297 | B2 | * | 3/2011  | Mirkovic et al. ............. 704/257 |
| 7,957,974 | B2 | * | 6/2011  | Cho et al. .................... 704/275 |
| 8,078,469 | B2 | * | 12/2011 | White et al. ............... 704/270.1 |

(Continued)

OTHER PUBLICATIONS

Humaid AlShu'eili, Gourab Sen Gupta, Subhas Mukhopadhyay. Voice Recognition Based Wireless Home Automation System. 2011 4th International Conference on Mechatronics (ICOM), May 17-19, 2011, Kuala Lumpur, Malaysia.*

(Continued)

*Primary Examiner* — Pierre-Louis Desir
*Assistant Examiner* — Matthew Baker
(74) *Attorney, Agent, or Firm* — Warren W. Kurz, Esq.

(57) ABSTRACT

A self-contained wireless interactive speech recognition control device and system that integrates with automated systems and appliances to provide totally hands-free speech control capabilities for a given space. Preferably, each device comprises a programmable microcontroller having embedded speech recognition and audio output capabilities, a microphone, a speaker and a wireless communication system through which a plurality of devices can communicate with each other and with one or more system controllers or automated mechanisms. The device may be enclosed in a standalone housing or within a standard electrical wall box. Several devices may be installed in close proximity to one another to ensure hands-free coverage throughout the space. When two or more devices are triggered simultaneously by the same speech command, real time coordination ensures that only one device will respond to the command.

24 Claims, 12 Drawing Sheets

U.S. PATENT DOCUMENTS

| | | | |
|---|---|---|---|
| 8,140,325 B2 * | 3/2012 | Kanevsky et al. | 704/226 |
| 2001/0041980 A1 * | 11/2001 | Howard et al. | 704/270 |
| 2002/0069063 A1 * | 6/2002 | Buchner et al. | 704/270 |
| 2005/0071159 A1 * | 3/2005 | Boman et al. | 704/233 |
| 2006/0222184 A1 * | 10/2006 | Buck et al. | 381/71.1 |
| 2008/0074258 A1 * | 3/2008 | Bennett et al. | 340/541 |
| 2008/0172232 A1 * | 7/2008 | Gurley | 704/251 |
| 2008/0290987 A1 * | 11/2008 | Li | 340/5.1 |
| 2009/0204409 A1 * | 8/2009 | Mozer et al. | 704/275 |
| 2009/0204410 A1 * | 8/2009 | Mozer et al. | 704/275 |

OTHER PUBLICATIONS

Filippo Cavallo, Michela Aquilano, Luca Odetti, Marco Arvati, Maria Chiara Carrozza. A first step toward a pervasive and smart ZigBee sensor system for assistance and rehabilitation. 2009 IEEE 11th International Conference on Rehabilitation Robotics Kyoto International Conference Center, Japan, Jun. 23-26, 2009.*

Alfonso Gárate, Nati Herrasti, Antonio López. GENIO: An Ambient Intelligence application in home automation and entertainment environment. Joint sOc-EUSAI conference. Grenoble, Oct. 2005.*

* cited by examiner

INTERACTIVE SPEECH RECOGNITION DEVICE AND SYSTEM FOR HANDS-FREE BUILDING CONTROL

BACKGROUND OF THE INVENTION

1. Field of the Invention

The present invention relates to improvements in automated control systems (e.g., home automation systems, building control systems, computer-controlled systems, etc.). More particularly, it relates to improvements in speech-recognizing control devices that respond to oral commands from a system user to produce a desired effect or result.

2. The Prior Art

Homes, offices and industrial buildings are often equipped with automated mechanisms for controlling, for example, lighting fixtures, motorized window treatments, security and access control systems, audio/visual equipment, thermostats, appliances, medical equipment, machines, etc. These systems are commonly controlled by one or more system controller components that, in response to instructions received from a user, produce suitable control signals to the output devices. Typically, the user instructs a system controller by using his or her hands to operate or manipulate electric control switches, pushbuttons, keypads or touch panels that, in turn, send appropriate electrical control signals to the system controller component either via a hard-wire connection therewith, or via a wireless communication systems operating in the infrared or radio-frequency (RF) band of the electromagnetic spectrum. See, for example, the RF-responsive home-automation system disclosed in U.S. Pat. No. 5,905,442 issued to Donald R. Mosebrook, et al. Alternatively, a user instruction can be initiated through the user interface of a computer or mobile device operating over the internet.

Addressing the concerns associated with locating and manipulating switches and buttons in a darkened room and the general inconvenience of interrupting tasks in order to activate or deactivate lighting fixtures, appliances and the like, U.S. Pat. No. 6,397,186 to W. S. Bush et al. discloses a hands-free remote control device that responds to the spoken commands of the user to control the operation of a plurality remote electrical fixtures and appliances. The disclosed device comprises a speech recognition system comprising a microcontroller that normally operates in a low power, "sound activation mode" in which it listens for a microphone's output. In the event the output of a microphone component exceeds a predetermined threshold, the microcontroller switches to a "speech-recognition mode" in which it is ready to receive speech commands. When the microcontroller recognizes a speech command, it produces a wireless (RF or IR) signal to control an automated, and suitably responsive, appliance, as commanded.

Recently, another hands-free automated home control system has been proposed that responds to speech commands from a system user to reduce the need for physical contact with the system's user interface. Such a system is described in a paper entitled "Developing a Voice Control System for ZigBee Home Automation Networks," published in the Proceedings of IC-NIDC2010, by researchers Jieming Zhu et al. at Beijing University. Note, ZigBee is a registered trademark of ZigBee Alliance and refers to a low-cost, low-power wireless RF (radio frequency) mesh networking standard that is widely used in wireless building control and monitoring applications. Here, a voice-controlled home automation system combines one or more speech recognition modules with conventional ZigBee-based wireless sensor and actuator networks to enable a system user to wirelessly control the operation of automated mechanisms via speech commands. Two different modes of hands-free operation are discussed in this paper, i.e. a "speech password mode" and a "circle recognition mode". In the speech password mode, a speech recognizer is constantly listening for one or more passwords, commonly referred to as "trigger phrases". When a trigger phrase is detected, the system "wakes up" and prompts the user to say one or more commands from an expected command phrase vocabulary. In "circle recognition mode", the speech recognizer is constantly listening for a complete set of allowable command phrases. When speech commands are successfully recognized by either method, the module produces RF control signals through an on-board ZigBee radio to various devices, sensors and power outlets that, in turn, control the operation of automated mechanisms to achieve a desired effect. The architecture described in this paper is desirable, since all of the speech recognition functions and user interaction is performed locally by embedded technology within the module. Hence, only control signals need to be transmitted between the speech recognition device and the targeted controller or automated mechanism, and therefore a high data rate network is not required which reduces system costs and complexity.

A significant problem emerges when attempting to use a speech-recognizing control device of the above type to provide totally hands-free speech recognition coverage throughout a room. Owing to ambient noise, room size, microphone quality, device location, room acoustics, furniture positions and a variety of other factors, a single control device may not be capable of reliably recognizing a speech command or trigger phrase from all locations throughout the given room. Indeed the above noted IEEE paper attempts to address this limitation by providing a third mode of operation, i.e., a "button mode", that requires the user to walk up to the device and a push a button to trigger speech recognition at close range. However, requiring a user to touch a button on the control device reduces the utility of the speech recognition system and undermines the fundamental design goal of providing totally hands-free control in the space.

In the above-noted IEEE paper, the authors state: "When speech recognition modules are deployed reasonably, users can give voice orders at any position of the house." The authors overlook, however, the fact that to provide complete hands-free speech recognition coverage and comfortable user interaction from anywhere in a building using speech recognition modules of this type, it would often be necessary to install many modules in reasonable proximity to one another, sometimes several per room in larger rooms. But, in doing so, it is inevitable that a given hands-free speech command would frequently be recognized simultaneously by two or more neighboring speech recognition modules. If multiple modules were to be triggered and audibly respond simultaneously, user confusion could occur. Worse, if two or more modules were to simultaneously process the same speech command, the target automated mechanism could be instructed by each triggered device to perform the same instruction with potentially undesirable or adverse effects. For example, "Lower Room Temperature Two Degrees" could be executed separately by several modules causing a thermostat to lower by multiples of the requested two degrees. One way to avoid this "duplicate response" problem would be to configure a unique speech trigger phrase for each module; but this would substantially reduce system usability, as the user would need to remember a large number of different trigger phrases—one for each speech recognition module.

In an attempt to address the above-noted "duplicate response" problem, one might also consider installing additional external microphones around a room that are operatively coupled to a single speech recognition module rather than locating several full speech recognition modules around a room. However, since speech recognition modules of this type preferably audibly interact with the user (e.g. "Are you sure you want to call the police?"), a user may not be able to comfortably hear an audio response from a relatively distant module after an external microphone successfully captures the user's speech command from a distant location in a room. Users may also have a natural tendency to turn toward the module that audibly responds to them (and potentially away from the external microphone that picked up their voice), which could negatively impact system reliability. Of course, adding operatively-coupled external audio speakers around a room could improve the audibility of audio responses. However, this overall approach would substantially increase the costs of such a system and reduce retrofit practicality since external speakers and microphones would need to be connected using physical wires or via a high data rate wireless connection capable of carrying high quality microphone and speaker audio signals. Finally, regardless of how many external microphones and speakers are installed in one room, should another interactive speech recognition module be installed in an adjacent room, the potential for the "duplicate response" problem still exists when a user's spoken voice can be heard clearly by speech recognition modules in both rooms at the same time.

SUMMARY OF THE INVENTION

In view of the foregoing discussion, an object of this invention is to provide an improved interactive speech recognition control device of the above type in which the aforementioned "duplicate response" problem is avoided when several devices simultaneously recognize the same speech command or trigger phrase.

Another object of this invention is to provide a totally hands-free, wireless building control system that is less dependent on the position of a user within a given space at a time when a speech command is spoken.

Another object of this invention is to provide a totally hands-free, interactive, self-contained, speech recognition system that does not require the installation of standalone, external wired or wireless microphones or audio speakers throughout a room.

Another object of this invention is to provide a totally hands-free, interactive, wireless speech recognition device and system that operate using low-power, low-data rate, wireless connections (e.g., ZigBee mesh and similar RF networks).

Another object of this invention is to provide an interactive self-contained speech recognition system that requires neither the transmission of audio signals (raw or compressed) from any external device to a speech-recognizing control device nor the transmission of audio signals (raw or compressed) from any speech-recognizing control device to any external device.

Another object of this invention is to provide a hands-free speech-recognition system that automatically determines which one of a plurality of interactive speech recognition control devices that have been simultaneously triggered by a speech command will further interact with the user as needed and control the system response.

In accordance with one aspect of the invention, there is provided an interactive, self-contained, speech recognition control device that is adapted for use in an automated building control system in which a plurality of such devices are positioned at different locations throughout a building space to enable a system user to control the actions of the system, via speech commands only, from various locations within the building space. Such device also enables the system to audibly interact (e.g. communicate status information) with the system user.

According to a preferred embodiment, the control device of the invention includes (a) a microphone for converting spoken words, emanating from a system user located within the building space, to corresponding electrical signals; (b) a programmable microcontroller, operatively coupled to the microphone and comprising embedded software and circuitry serving to (i) recognize from the electrical signals when a speech command from an expected vocabulary or grammar has likely been spoken, and (ii) to act thereon to first produce a weighted signal representing the quality of a just-recognized speech command, and then produce, only in the event the value of said weighted signal exceeds the respective values of all weighted signals produced by other devices within said building space that simultaneously recognized the same speech command, predetermined system control signals by which a desired effect, reflective of the speech commands, is achieved within the building space by system controllers or automated mechanisms that respond to such system control signals; (c) a transmitter operatively coupled to the microcontroller for selectively transmitting the weighted signal and the predetermined system control signals into the building space; (d) a receiver, operatively coupled to the microcontroller, for receiving weighted signals emanating from one or more other control devices within the building space; and (e) audio output circuitry through which the microcontroller can transmit audible sounds to interact with and provide indications of the system status to the system user.

A preferred characteristic of the control device of the invention is that, within a predetermined time interval after it has produced the weighted signal in response to recognizing a given speech command, the microcontroller operates to compare the value of this signal with the respective value(s) of the weighted signals produced by all other control devices that have been triggered by the same speech command at the same time and have transmitted their respective weighted signals to such microcontroller. In the event the value of such weighted signal exceeds the respective values of all other weighted signals with which it has been compared, the microcontroller proceeds in handling the given speech command. Otherwise, it defers handling of the speech command to the other devices and reverts to a "listening mode," awaiting subsequent speech commands. To make this comparison of weighted signals, it is preferred that the control device operates to broadcast its weighted signal to all other like devices in the given space. Alternatively, the control device transmits its weighted signal only to selected neighboring devices having a two-way communication system with which it has been paired.

According to another aspect of the invention, an automated building control system (e.g., a home automation system) is provided. Such a system includes (a) a plurality of automated mechanisms that respond to predetermined system control signals to achieve a desired effect within a building space; and (b) a plurality of interactive, self-contained, speech recognition control devices of the type disclosed herein. Preferably, each of the respective microcontrollers of the control devices operates to compare the respective values of weighted signals received from other control devices with the value of the weighted signal it has produced to determine whether said microcontroller will produce the audible user interactions and system control signals necessary to carry out a given speech command within said building space. Alternatively, such comparison of weighted signals is effected by an external or internal coordinating controller that independently determines which of a plurality of devices simultaneously recognizing the same speech command will interact with the system user and handle the speech command to achieve a desired result.

According to yet another aspect of the invention there is provided a building automation system comprising a plurality of the above-noted interactive speech recognition control devices, and at least one system controller operatively coupled with each of said devices and adapted to effect desired changes by the automated system through various controlled circuits (i.e. automated mechanisms) in response to system control signals produced by any one of said interactive speech recognition control devices. Alternatively, the respective outputs of the interactive speech recognition control devices are used to adjust the controlled circuits directly, i.e., without any intervening system controller.

Another object of this invention is to provide an in-wall embodiment of the aforementioned device that fits within a standard electrical wall box and incorporates additional circuitry that allows the microcontroller to control the switching or dimming of an operatively-coupled electrical or lighting load.

The invention and its advantages will be better understood from the ensuing detailed description of preferred embodiments, reference being made to the accompanying drawings in which like reference characters denote like parts.

DETAILED DESCRIPTION OF PREFERRED EMBODIMENTS

In the prior art references noted above, the general concept of combining embedded speech-recognition technology with wireless (e.g., RF) transmission to provide hands-free building control is discussed in some detail, and the respective disclosures of these documents are incorporated herein by reference.

Disclosed hereinbelow is a relatively small, low-cost, self-contained, human interactive speech recognition control device (shown in FIG. 1) that combines embedded speech recognition technology with wireless (or power line) networking technology to provide reliable "hands-free" voice control throughout any home or commercial building having controllable automation systems, appliances, electronic equipment or machines (i.e. "automated mechanisms"). Such control device includes embedded speech recognition software and circuitry capable of quickly recognizing spoken speech commands from an expected vocabulary or "flexible grammar". When used in a hands-free building control system in which several, functionally-identical devices are strategically placed throughout an automated building space, each device represents one intelligent node of the system through which a system user can achieve a desired effect within the space without physically touching any system component within the space. The low-cost design of the device lends itself to liberal use of as many control devices as are needed to ensure reliable and comfortable hands-free control throughout a space. By liberally positioning the devices within a given space (sometimes several per room), "comfortable" interaction is achieved—there is no need to raise one's voice to have a speech command recognized by a control device, nor the need to strain to hear the audio responses from such device.

Figure 1:
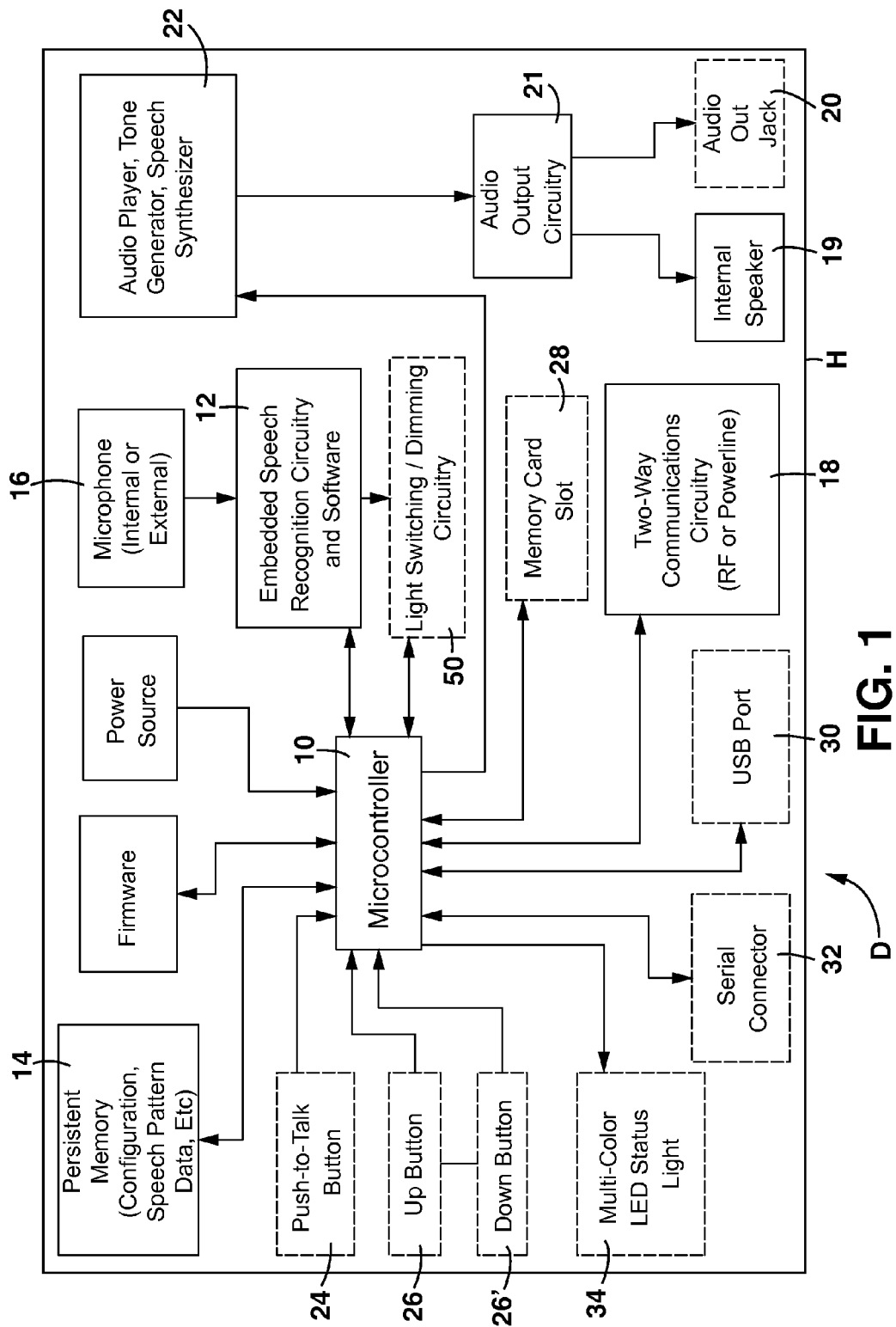
FIG. 1 is a functional block diagram of an interactive speech recognition control device embodying the present invention.

Referring to the drawings, FIG. 1 schematically illustrates an interactive speech recognition control device D that is configured in accordance with a preferred embodiment of the invention. Device D is capable of communicating wirelessly using radio frequency (RF) communication with other similarly configured devices, as well as with existing controllers of home automation systems, building control systems, and various machines to add useful "hands-free" speech control capabilities to these systems. The device of the invention integrates easily with any commercially available system controller (e.g., those used in wireless home automation systems made by Control4 Corporation, Lutron Electronics Co., Inc), to control, by speech commands only, any of the diverse functions that are normally controlled by such system controllers. Further, it can be used to directly control the operation of wirelessly-controllable electronic devices and appliances (i.e. "automated mechanisms") manufactured by various companies that conform to standards such as ZigBee. For example, thermostats, light switches, motorized shading systems, audio-visual equipment, security systems, kitchen equipment, pumps, motors and actuators may all be controlled directly by device D.

The device of the invention achieves the above-noted results through its combination of a uniquely-programmed microcontroller 10 having embedded speech recognition circuitry and software 12, a persistent internal memory 14 (e.g. non-volatile flash memory) for storing speech pattern data (phoneme expressions, etc) and the like, a microphone 16 through which speech commands from the user are received, and a two-way, preferably wireless, communication system 18, all being supported by a housing H that can be placed anywhere in a room or installed in an electrical wall box. Suitable embedded speech recognition circuitry and software 12 is commercially available from a variety of manufacturers (see, e.g., IC Route's Model LD3320, and Sensory, Inc.'s Model NLP-5x). These circuitry and software packages are preferred due, in part, to their ability to perform both speaker independent and speaker dependent speech recognition on a single chip. Both speaker independent and speaker dependent recognition are useful in building automation systems. For example, in an office automation system, all personnel may be permitted to turn the lights on in a room, but only certain recognized personnel might be authorized to use speech control to disarm the building's security system. Preferably, each device incorporates features that allow both speaker dependent and speaker independent recognition vocabularies to be configured and active at the same time. The embedded speech recognition circuitry and software 12 and persistent memory 14 in each device is configured to recognize a fixed vocabulary of spoken commands, whether spoken discretely by the end user or as part of a flexible grammar containing one or more commands spoken in a variety of ways. For example, the spoken words "TV Tune CNN" and "Watch Cable Channel CNN" may both be recognized by device D and translated into the same control instructions when a flexible grammar is implemented. Like devices in different positions of the same building will often be configured with different active vocabularies and grammars that match the equipment available and speech control needs of intended users in that room.

Preferably, the two-way communication system 18 of device D is a wireless or power line communications system adapted to interact with other control devices, controllers and automated mechanisms so that it can be placed in a location most optimal for processing speech commands and interacting with users in that room or space. The most preferred communication system uses RF communications complying with IEEE 802.15.4 standards, such as the ZigBee standard, given this standard's desirable attributes, such as low power consumption, fault tolerance and interoperability with myriad automated mechanisms. However, a wide range of standard and proprietary wireless communication technologies can work with this invention including Wi-Fi, Z-Wave, Bluetooth and others. Power line communications technologies such as X10 or Universal Power line Bus (UPB) are also an effective way to implement the communication needs of this invention. Wi-Fi is a registered trademark owned by the Wi-Fi Alliance, and it refers to wireless local area network (WLAN) products that are based on the Institute of Electrical and Electronics Engineers' (IEEE) 802.11 standards. Z-Wave is a competing technology to ZigBee and is a registered trademark of Zensys, Inc. The Bluetooth trademarks are owned by the Bluetooth SIG and licensed for use to companies that are incorporating Bluetooth wireless technology into their products. X10 is a registered trademark of X10 Wireless Technology, Inc. Universal power line bus (or UPB) is a protocol for communication among devices that uses power line wiring for signaling and control. UPB was developed by PCS Power line Systems of Northridge, Calif.

Another component of device D is an internal speaker 19 through which the microcontroller can transmit, via audio output circuitry 21, audio signals from an audio source 22 that can incorporate beeps and tones, prerecorded audio and synthesized speech for user interaction.

In addition to the above-discussed components, additional functions and features (shown in phantom lines) include a "Push to Talk" button 24 by which a user can manually trigger a device for processing a subsequent speech command, and "up" and "down" buttons 26, 26' through which, e.g., the volume of an audio output for user interaction (e.g. synthesized speech or audio playback) can be adjusted. An audio output jack 20 is supported to allow for external speakers and additional amplification of device audio responses as necessary. Preferably, device D also includes a memory card slot 28 and a USB port 30 through which firmware, command vocabularies, pre-recorded sound data and configuration data can be loaded into the device, a serial connector 32 by which the device can be physically interfaced with system controllers and various automated mechanisms, and a multi-colored LED status light 34 for visually indicating various device states and modes.

Preferably, device D normally operates in a low power "listening" mode in which it listens for a hands-free trigger phrase (e.g., "Hello Voice Control" or "Home Automation") to be spoken by the system user. Upon receiving and recognizing a speech trigger phrase and determining that it is in a better position to handle subsequent user interaction than any other device that simultaneously recognized the same speech trigger phrase (see device coordination discussion below), or when the user depresses the "Push to Talk" button 24 on the device, or in the event the device is instructed to wake up and expect a subsequent speech command by a system controller, the device beeps, changes its status light 34 or plays a prerecorded or synthesized audio message (e.g. "How may I help you?") through speaker 19 and/or 20 to prompt the user to say one of the speech commands from a known vocabulary or grammar stored in the speech pattern memory 14. Upon recognizing a particular speech command (and optionally confirming with the user), the device produces and transmits either to a system controller or directly to the automated mechanisms (via its communications circuitry 18) a corresponding system control signal designed to instruct the appropriate automated mechanisms to carry out the subject of the speech command. Such control signal may be in the form of integration data strings or other instructions compatible with and/or expected by the system controller or automated mechanisms. Special software available to installers allows each device's behavior to be altered for optimal performance in a given application. For example, the installer may decide that a recognized command (e.g., "Call the Police") needs to be repeated and confirmed with the user before execution. For maximum utility, the mapping of speech commands to controller-compatible messages, commands and interface strings can be provided within the device. Preferably, special integration tools are used to configure the device to speak the language of the system controller or automated mechanisms, rather than the opposite. Using standardized command and messaging formats such as ZigBee's HA application profile is a preferred integration technique for the device.

Figure 2A:
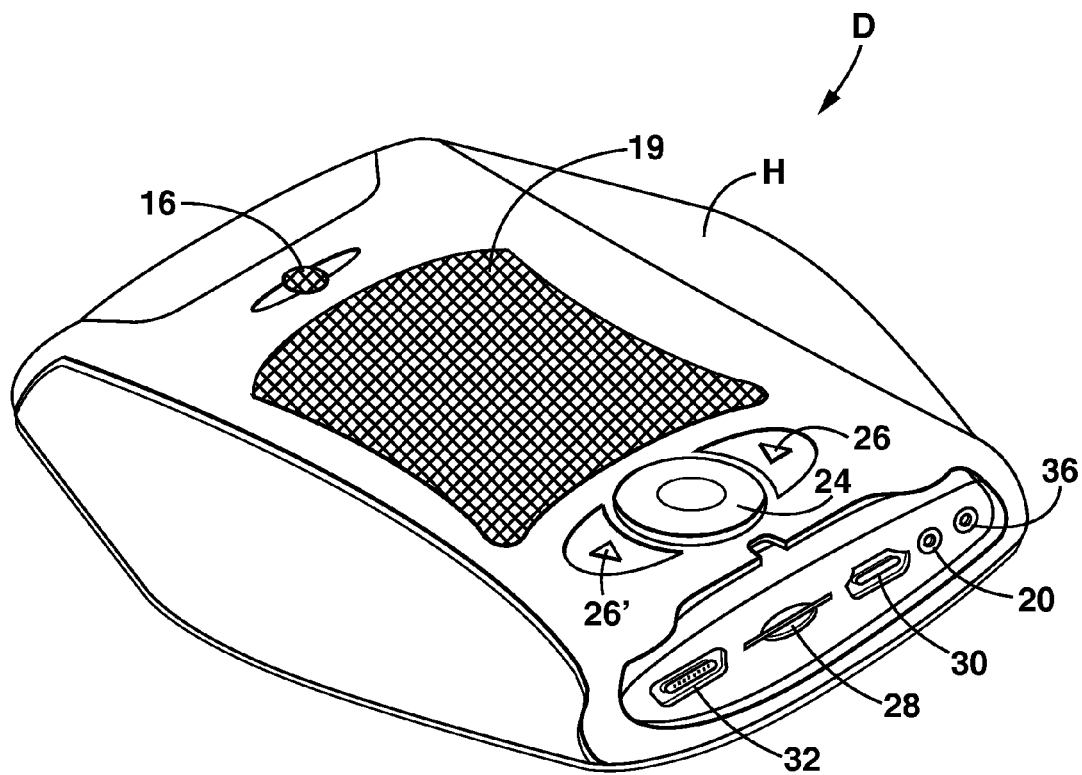
FIG. 2A is a perspective illustration of a contemplated table-top housing for containing the device of FIG. 1.

In the perspective illustration of FIG. 2A, a preferred physical appearance of the device's housing H is shown in a table-top configuration 40, and the visible components of those noted above are designated by the same reference characters. The table-top devices can be placed strategically around a room on tables or fastened to walls to optimize microphone and speaker placement while preserving room aesthetics. Preferably, the table-top device supports an external microphone jack 36 and audio output jack 20 so that an external microphone and speaker could be used to accommodate special situations. (E.g. satisfying décor and space requirements). Tabletop devices would ideally run on batteries or use a plug-in transformer for power.

Figure 2B:
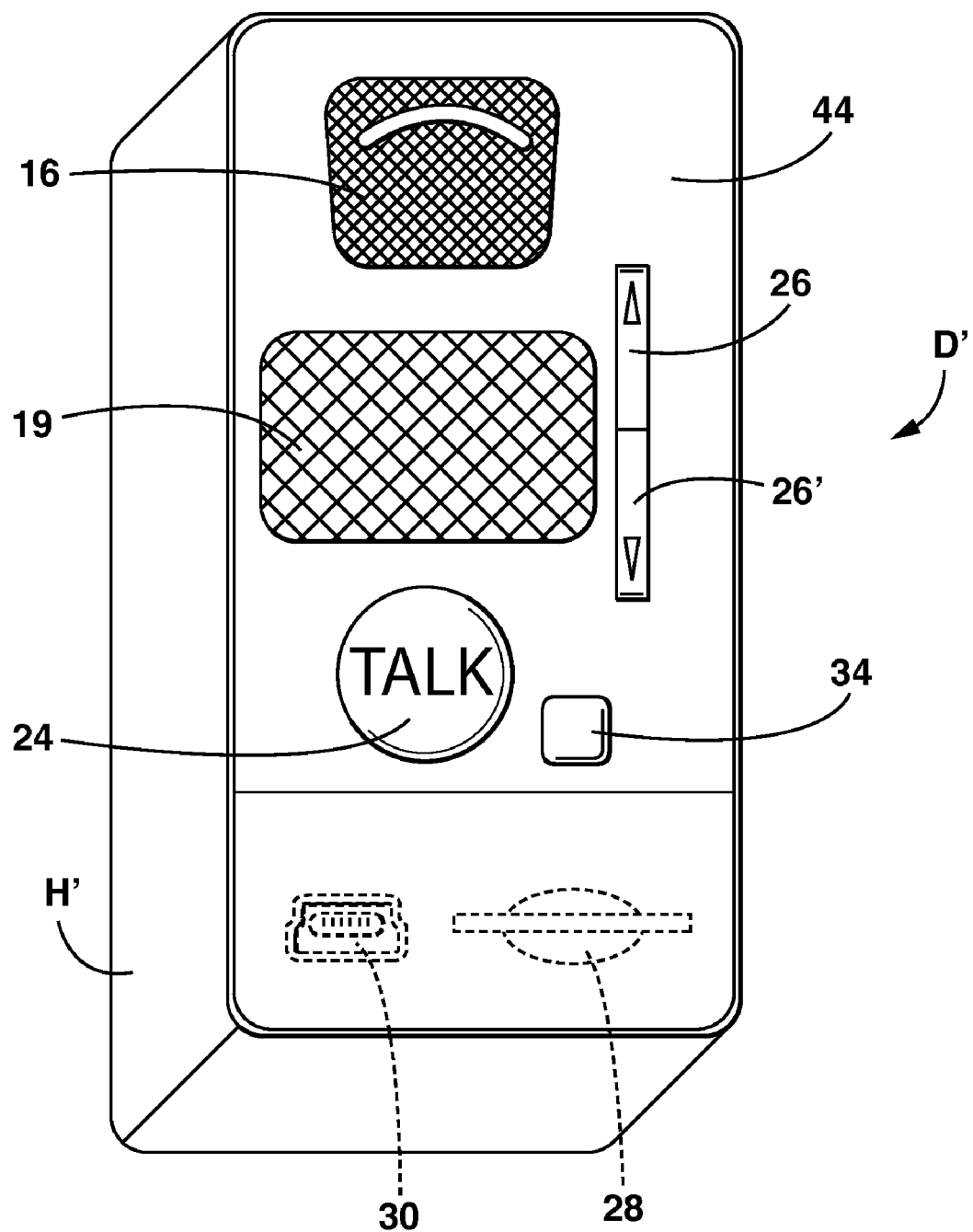
FIG. 2B is a front plan view of a faceplate for a standard electrical wall-box housing that contains the FIG. 1 device.

In FIG. 2B, housing H' is supported within a standard electrical (light switch) wall box (not shown), and the faceplate 44 is designed to expose the built-in speaker 19, microphone 16, talk button 24, up and down buttons 26, 26'. A USB port 30 and memory card slot 28 are accessible under a flip-down plate for use by installers. The preferred in-wall device is designed to be powered by low voltage or line voltage or both. Utilizing table-top and in-wall embodiments together in the same space provides flexibility in device positioning for optimal microphone coverage and comfortable user interaction. Optionally, as discussed later herein, this in-wall embodiment includes electrical switching and/or dimming circuitry 50 by which the in-wall device of the invention can replace an existing electrical control device residing in a wall box (e.g. a light switch) while retaining the device's original switching or dimming function at that location.

As indicated above, providing a truly hands-free, self-contained control device by which a person can verbally interact with a building automation system to control its operation from virtually any location within an automated building space can be problematic. To provide complete interactive speech recognition coverage for a given building space, it is necessary to provide multiple control devices strategically scattered throughout the space (e.g., as illustrated in the home automation system illustrated and discussed below with reference to FIG. 3.) As noted above, when a speech command trigger is recognized by more than one control device at the same instant, it is important that only one of the devices responds to (interacts with) the user and handles the user's request. If more than one device were to respond to the user and send multiple identical control signals to a system controller or automated mechanism, confusing and incorrect outcomes can occur (e.g. a system controller could be told to execute the same instruction multiple times). Thus, this duplicate response problem must be avoided.

The duplicate response problem is best illustrated with reference to FIG. 3. There, a residential floor-plan is shown as containing a home-automation system in which several of the above-described table-top control devices (T1 through T6) and electrical wall-box mounted control devices (W1 through W9) of the invention are strategically positioned to provide hands-free operation throughout the illustrated space, including in the Living Room, Foyer, Dining Room, Laundry Room, Kitchen and Balcony. Automated mechanisms such as Door lock DL1, security panel A1, television TV1, thermostat Tstat1, light dimmers L1, L2, L3, L4 and L5 and motorized shades S1, S2 and S3 may all be controlled "hands-free" by persons P1, P2, P3 and P4 using only speech commands. Control signals may be sent directly from any speech recognition device to system controller C1, which in turn, sends appropriate control signals to the target automated mechanisms to implement the speech command. Alternatively, any speech recognition device can control the automated mechanisms directly using standard wireless communications and automation protocols such as Zigbee.

Figure 3:
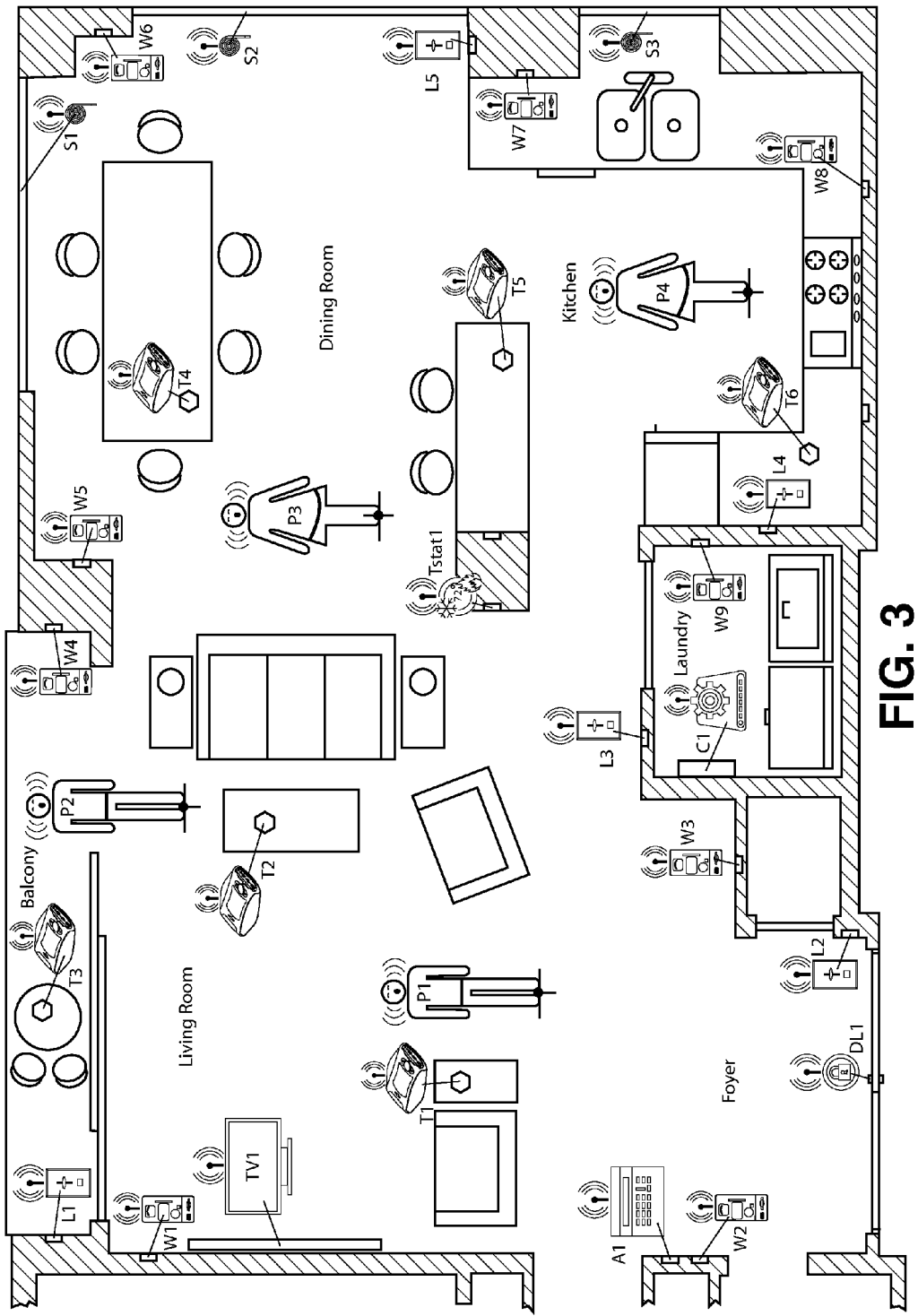
FIG. 3 illustrates a residential floor plan showing a plurality of interactive speech recognition control devices at various locations that provide totally hands-free speech control of various automated mechanisms throughout the interior space.

Still referring to FIG. 3, if person P3 stands in the dining room near the kitchen island and speaks a trigger phrase such as "Hello Voice Control", table top devices T2, T4, T5 and T6 and in-wall devices W5 and W9 may all successfully "hear" and recognize this speech trigger. Thus, each of these devices, even those devices in different rooms (e.g. T2, T6 and W9) will want to respond to the same speech command. If they all were to respond with "How may I help you?" person P3 could become confused. Worse, if person P3 would proceed to say the speech command "Toggle All Shades", intending to close currently-open window shades S1, S2 and S3, control devices T2, T4, T5, T6, W5 and W9 would all instruct system controller C1 to toggle the shades, resulting in the shades going up and down 6 times and ultimately remaining open. Therein lies the "duplicate response" problem.

In accordance with the invention, each control device D is programmed so that multiple devices can be placed in close proximity to one another in the same space. In accordance with a preferred embodiment, different devices recognizing the same speech command from the same person at the same instant coordinate with each other (shown in FIGS. 9, 10), or with an external coordinating controller CC (shown in FIGS. 7, 8), to ensure that only one device handles each discrete speech command, preferably the one able to hear the user as loudly and clearly as possible. Often, but not always, the device in closest physical proximity to the system user at the time a command is spoken will "hear and understand" the user's speech command the best. However, a multitude of factors may allow a device other than the one nearest to the user to achieve better speech recognition results. For example, referring again to FIG. 3, if person P1 issues a triggering speech command while television TV1 is on, devices T1, W2 and W3 may all be able to recognize the speech command. However, even though unit T1 is closest to person P1, unit W3 may hear the person more clearly as a result of additional background noise entering device T1's microphone from television TV1. The embedded speech recognition circuitry and software 12 inside T1 may consequently be less confident that it heard the command correctly than W3, whose microphone 16 may be receiving a clearer audio signal of the user's voice with less background noise from TV1. In this case, it would be acceptable for unit W3, rather than T1, to wake up, interact with person P1 as needed and process the user's speech command.

With the above in mind, the control device of the invention uses one of several different coordination methods to achieve the design goal of avoiding duplicate responses to the same speech command while selecting a single control device best able to successfully interact with the system user. All of the methods involve the calculation and production by the control device of a numeric weighted signal (WS) that quantifies the "quality" of a just-recognized speech command. Preferably, the value of the weighted signal is based on at least two variables, specifically, the microphone signal strength (SS), which is directly related to the proximity of the user to the device, and the recognition confidence (RC) which quantifies the probability that a speech command was recognized correctly. Embedded speech recognition IC modules and software (e.g., the above-noted Model LD3320 from IC Route and Model NLP-5x from Sensory, Inc.) calculate and return these measures each time they successfully match (i.e. recognize) a spoken word or phrase with their active vocabulary or grammar. The SS variable is a number that represents the relative loudness at which a user's voice was heard by the microphone 16 while the user was speaking a recognized speech command. For example, SS may be calculated by the embedded speech recognition circuitry and software 12 as the sound pressure level experienced by the microphone during the time period a subsequently-recognized speech command was being spoken. The RC variable is a numeric value the embedded speech recognition circuitry and software 12 produces upon successfully recognizing a speech command. RC refers to the speech recognition algorithm's calculated probability that a correct match (i.e. correct recognition) has occurred between the electrical output signals produced by the microphone in response to the spoken words of a user and the expected speech patterns, signatures and/or phonemes of the just-recognized speech command or grammar.

The preferred embodiment provides flexibility in the calculation of each weighted signal. Preferably, the weighted signal numeric value (WS) is calculated as follows:

$$WS=(SS\_factor \times SS)+(RC\_factor \times RC)+rand(1)$$

The SS_factor and RC_factor multipliers allow the device installer to adjust the relative weightings of SS and RC in the computation of the weighted signal value WS. In different installations, it may be necessary to weight SS and RC differently to achieve optimal results. The rand(1) function returns a random real number that is greater than or equal to 0 and less than 1. By adding a small random number to each WS calculation, the possibility of two devices calculating the same WS for a given speech command is eliminated.

As an example, let us assume that the SS variable is always returned as a number in the range 1 and 10,000 and that the RC variable will always be between 1 and 5 (with a 5 indicating the highest confidence). An installer may choose to set the SS_factor to 1 and RC_factor to 2000 if "equal weighting" of the signal strength and recognition confidence is to be used. Another installation might get better results by overweighting RC. This is achieved by setting RC_factor to a larger number (e.g. 5000). Or, if RC is to be ignored, RC_factor could be set to 0. RC_factor and SS_factor settings are configurable by the installer in the preferred embodiment for maximum flexibility in a wide range of situations.

Figure 4:
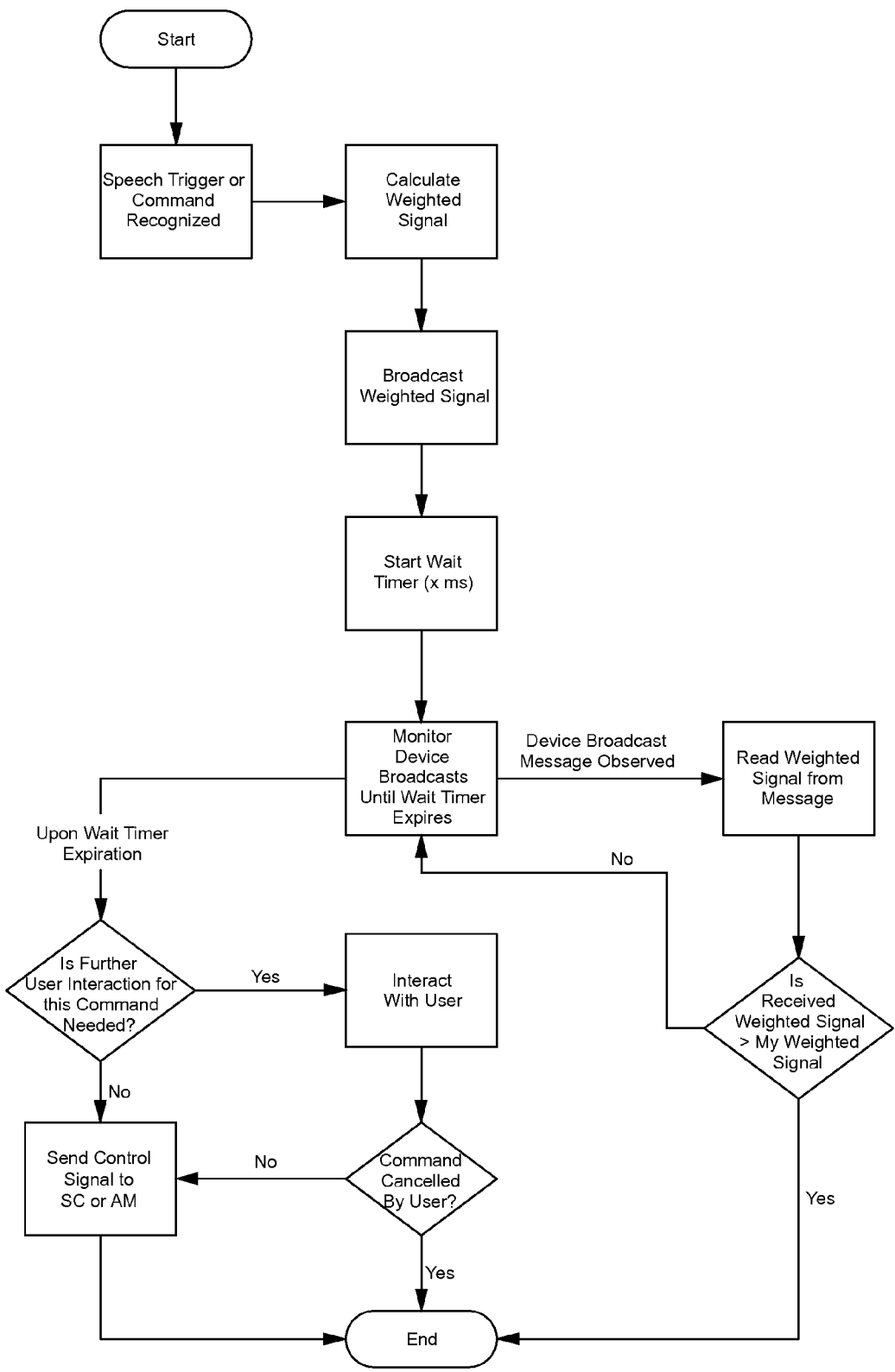
FIG. 4 is a flowchart illustrating preferred programming methods by which a plurality of FIG. 1 control devices that have responded to the same speech command broadcast their weighted signals and collectively decide which one will further handle such speech command and interact with the system user.
Figure 9:
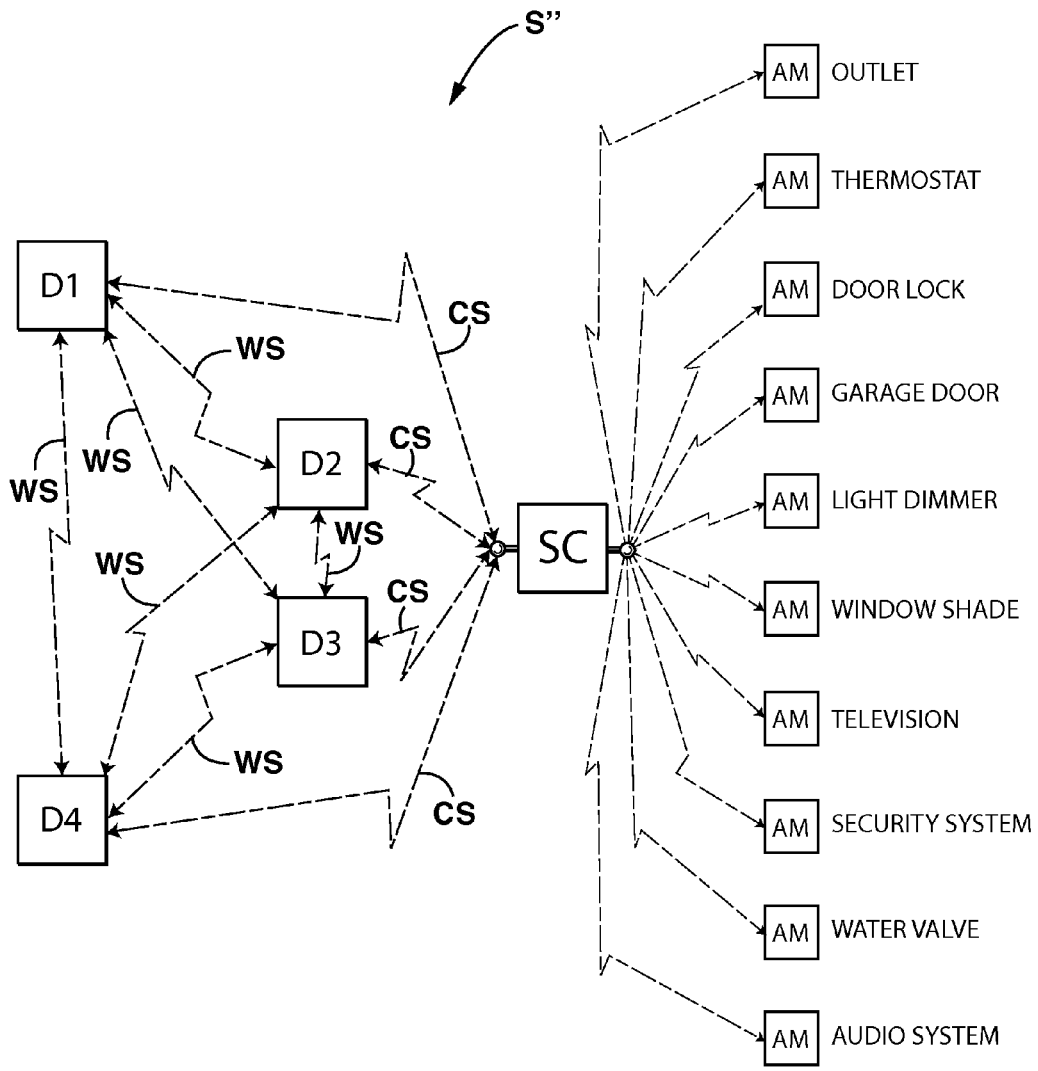
Figure 10:
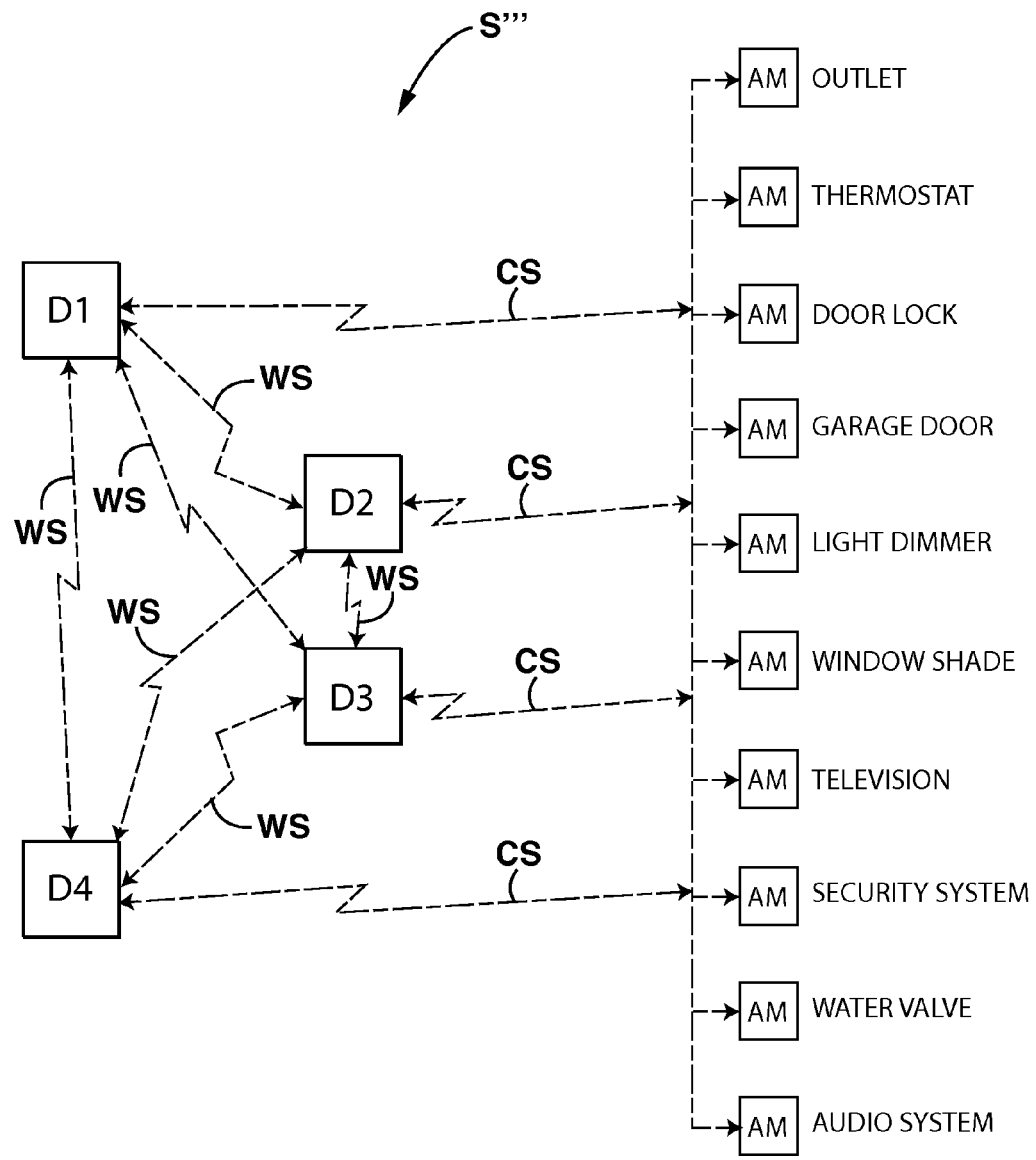

Once each device in a space that recognizes a speech command has calculated its weighted signal, there are a number of methods for the devices to be coordinated so that only the single device with the highest weighted signal proceeds to interact with the user and/or process the speech command. Four possible methods for achieving this goal are:

Broadcast and Monitor
Coordinating Controller—Optimistic
Coordinating Controller—Pessimistic
Paired Neighbor Coordination According to the Broadcast and Monitor method, illustrated in the high level flowchart of FIG. 4, the microcontroller 10 of each control device is programmed to carry out the decision-making shown. First, the microcontroller waits to be "triggered." (i.e., switched from a "listening" mode to an active mode). In the event the microcontroller was triggered hands-free through its recognition of a spoken trigger or command phrase, the device calculates a weighted signal as described above. It then sends its weighted signal to each of the other interactive speech recognition control devices connected to the same network using a broadcast or group multicast messaging technique. As schematically illustrated in FIG. 9 and FIG. 10, a network broadcast effectively links all interactive speech recognition control devices in a given space, allowing each device to send its weighted signal to each other device. Any non-triggered control devices (devices that did not "hear" and recognize a just-spoken command phrase) simply ignore any broadcast weighted signal messages they receive and continue listening for new speech commands. Immediately after broadcasting its weighted signal, a triggered device waits a predetermined amount of time while it monitors weighted signal messages that may have been simultaneously broadcasted from other like devices. During this short waiting period (typically between 25 and 250 milliseconds), should a message containing a higher weighted signal that has been broadcasted from another device be received, the device immediately terminates processing and resumes listening for a future speech command. If the waiting period expires and no message containing a higher weighted signal is received from any other control device, the device proceeds to handle the speech command by interacting with the user as needed and subsequently transmitting the appropriate system control signals if the user does not cancel the command during user interaction. This method of coordination is preferred since it does not involve any centralized processing and utilizes network "broadcast" or "group multicast" techniques which are available on most types of wireless and power line networks. Further, it minimizes potential network latency problems since the weighted signal messages will generally travel between devices very quickly. To compensate for any network or device latency issues, the preferred embodiment allows the installer to specify the length of time each device waits and monitors broadcast weighted signal messages before proceeding. Referring again to FIG. 3, if person P2 issues a speech command trigger such as "Hello Voice Control", devices T2, T3 and W4 may all be triggered. Each of these devices would immediately calculate and broadcast their respective weighted signals to all control devices. Non-triggered devices, such as W8 would receive and ignore the broadcasts from each of the three triggered devices. Assuming T2 receives the highest quality speech command, both T3 and W4 will receive a weighted signal that is higher than their own respective weighted signals during the waiting period and each will immediately terminate further processing. When T2's waiting period expires, it will not have received any weighted signals from T3 or W4 that were higher than its own. Hence, only T2 will interact with person P2 and handle a subsequent speech command.

Figure 5A:
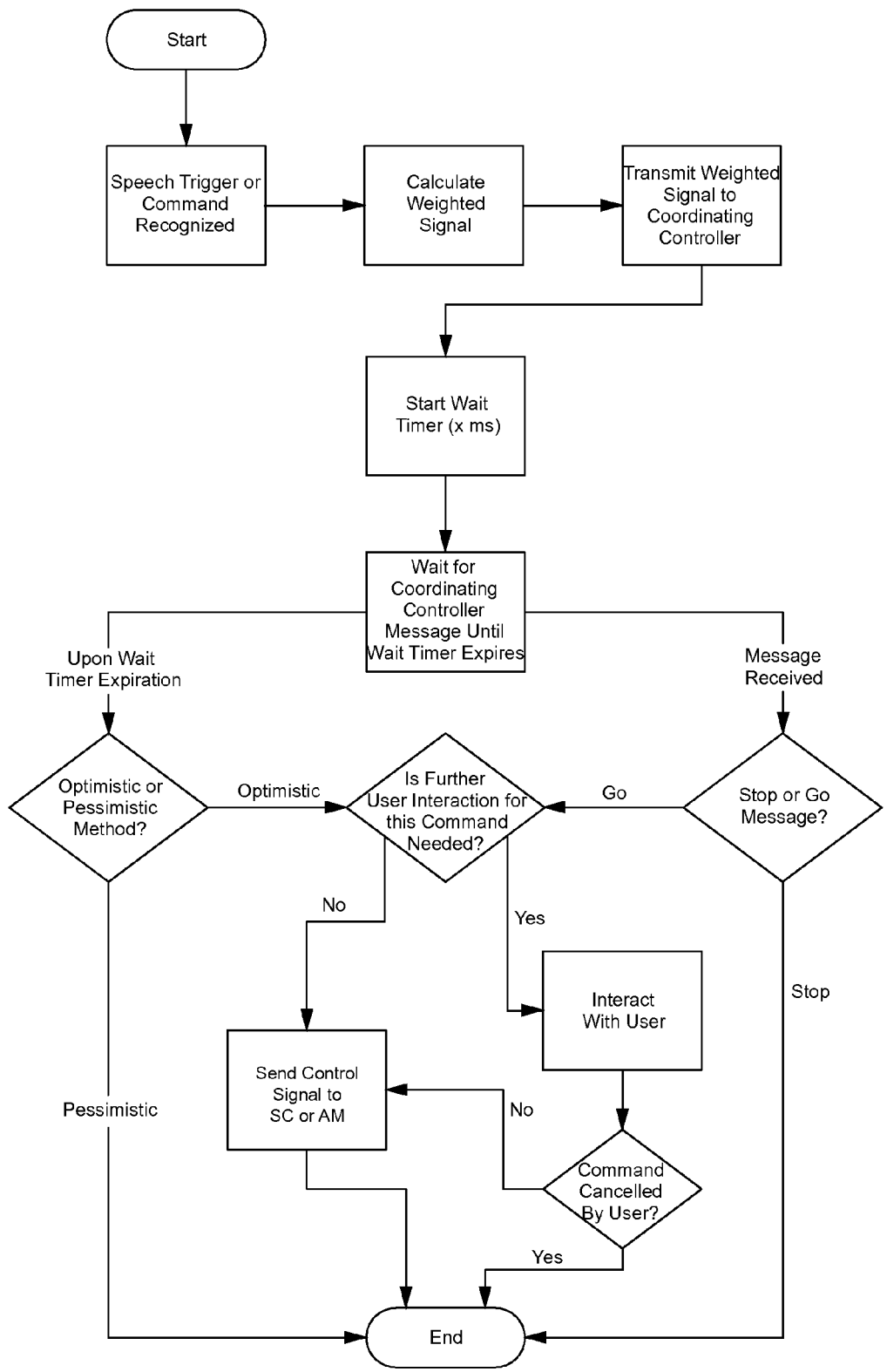
FIGS. 5A-5B are flowcharts illustrating preferred programming methods by which an independent coordinating controller that has received individual weighted signals from a plurality of control devices indicating the quality of a speech command each has just-recognized decides which device will further process that speech command.
Figure 7:
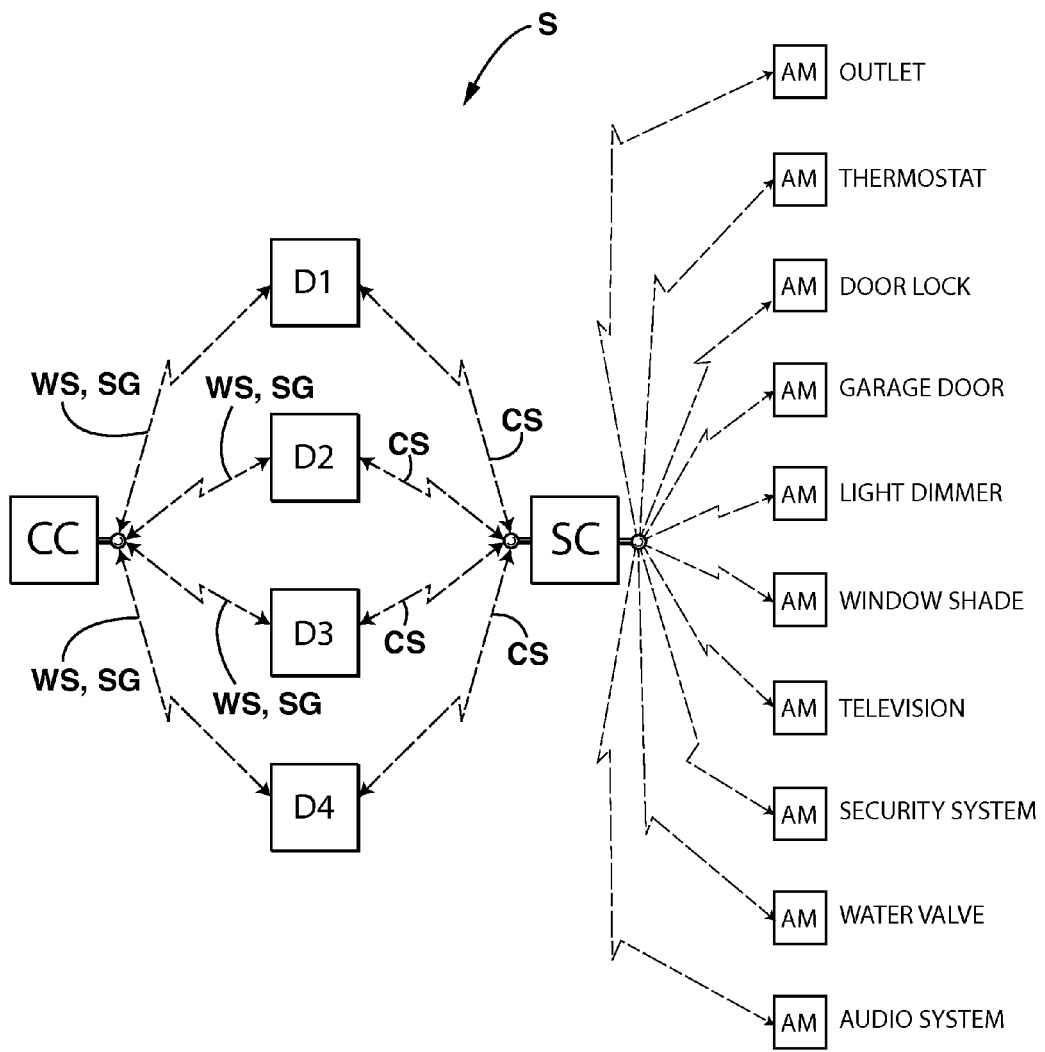
FIGS. 7, 8, 9 and 10 are block diagrams illustrating various system architectures in which a plurality of the control devices of the invention either coordinate amongst themselves or utilize a coordinating controller to decide which control device will handle a given speech command when more than one control device has been simultaneously triggered.
Figure 8:
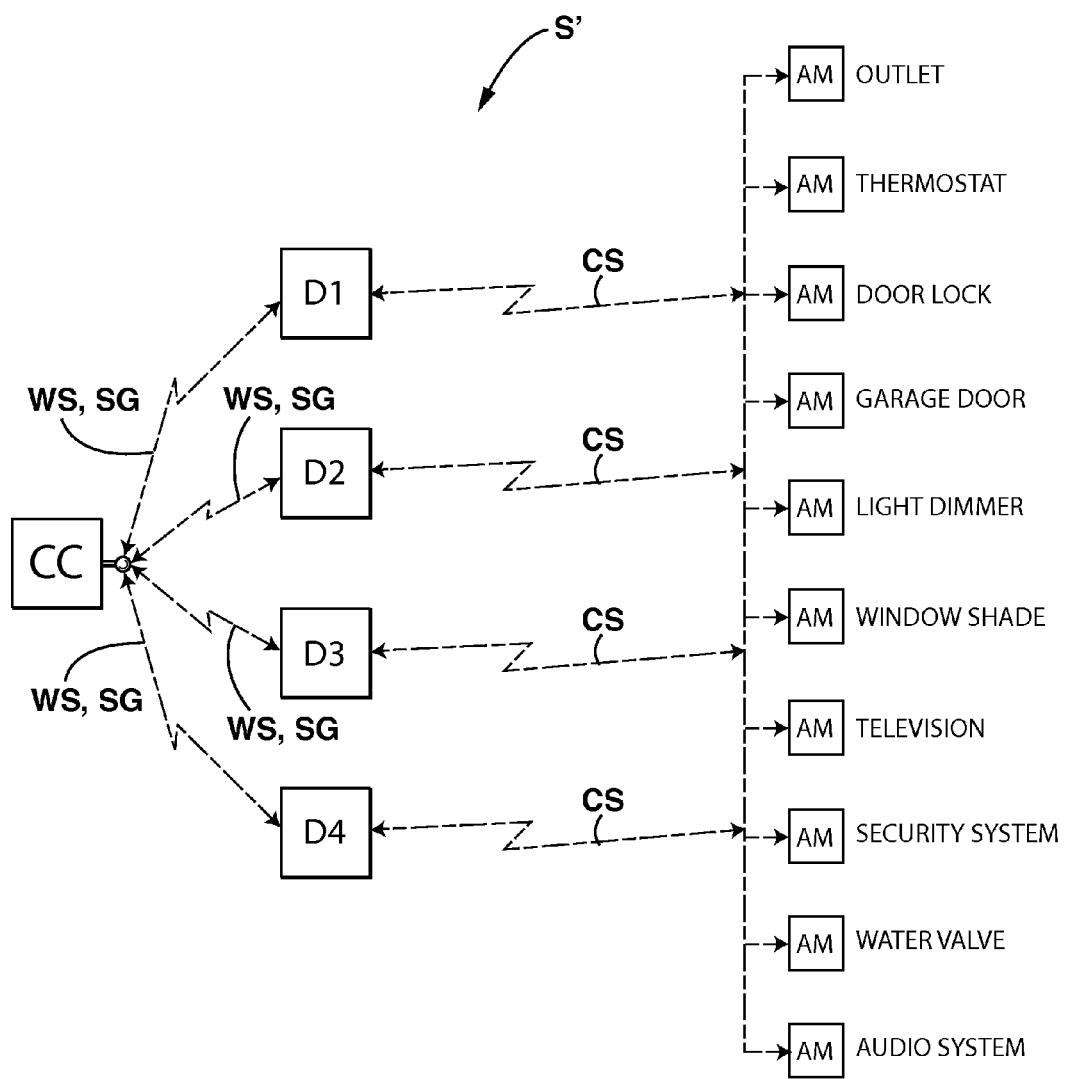

The flowchart in FIG. 5A illustrates a device's programming logic for two possible implementation methods for a coordinating controller technique (optimistic and pessimistic). For these methods, when a speech command triggers a control device, the device calculates a weighted signal as described above. Next, it sends its weighted signal over a network directly to an independent coordinating controller via a unicast message. As schematically illustrated in FIG. 7 and FIG. 8, a coordinating controller provides coordination services for all interactive speech recognition control devices in a given space. The coordinating controller generally comprises the combination of a programmable microcontroller and a transceiver, preferably an RF wireless (or power line) two-way communicator, for communicating with each of the control devices in the space. The coordinating controller can be implemented on a system controller, a network server or even another interactive speech recognition control device. Immediately after sending its weighted signal to the coordinating controller, a device waits a predetermined amount of time for a return unicast message from the coordinating controller.

In the optimistic model, a device will proceed to interact with the user as needed and process the speech command after the waiting period expires unless it receives a unicast message back from the coordinating controller telling it not to proceed.

In the pessimistic model, a device will not proceed to process the speech command after the waiting period expires unless it receives a unicast message from the coordinating controller explicitly telling it to proceed.

Figure 5B:
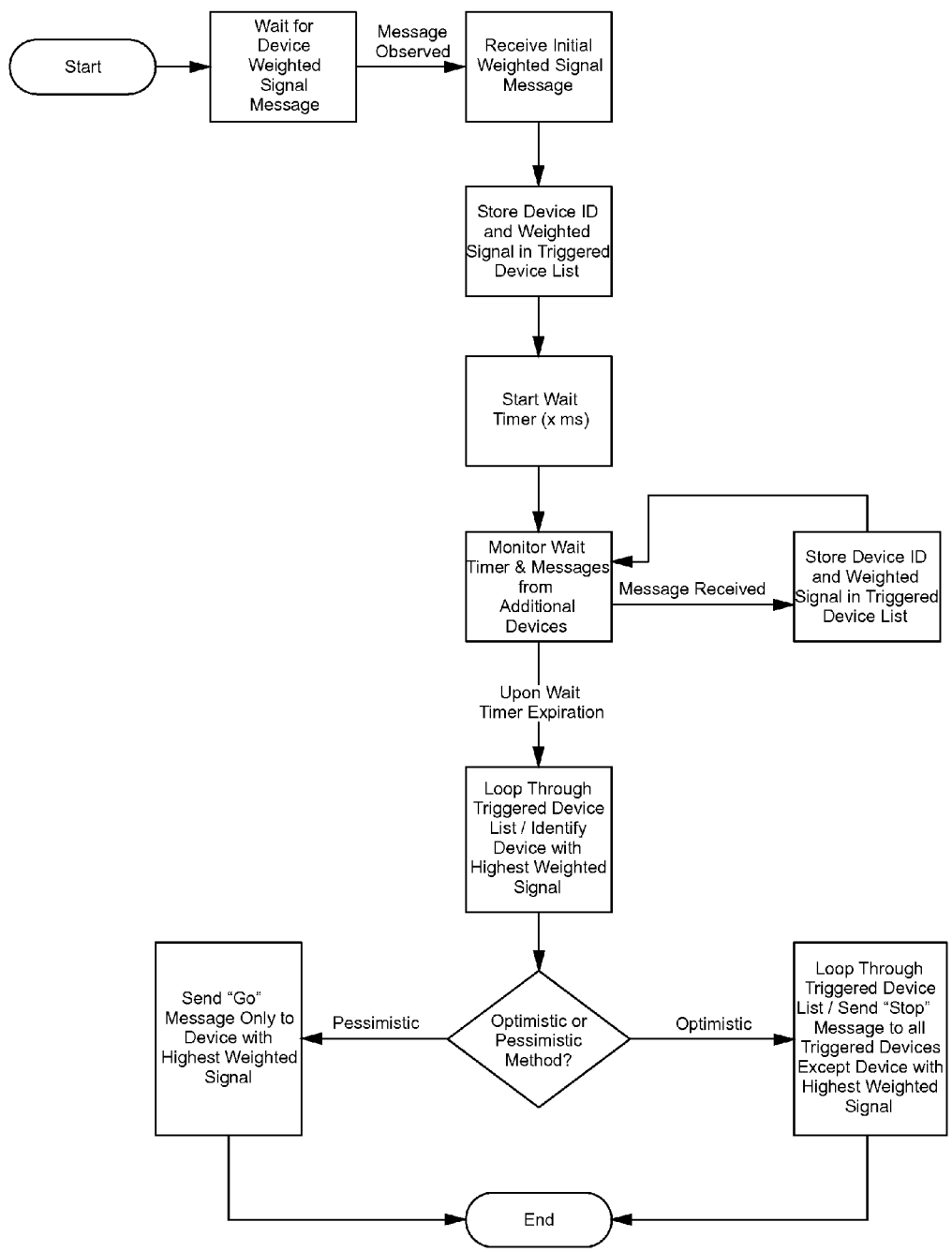

FIG. 5B illustrates a coordinating controller's flowchart for two possible implementation methods for the coordinating controller technique (Optimistic and Pessimistic). Each time the coordinating controller receives an initial weighted signal unicast message from a control device, it stores the control device's network ID (unique network address) and weighted signal and then waits a predetermined amount of time to receive and store network IDs and weighted signals from other control devices that may have been triggered by the same speech command. Note that the "network ID" referenced above is the unique identifier or address assigned to each device that is needed to direct unicast messages sent over the network to a particular device.

In the optimistic model, when the waiting period expires, the coordinating controller sends "stop" unicast messages to all triggered control devices except for the device which sent the highest weighted signal during the waiting period after the initial message was received. In the pessimistic model, when the waiting period expires, the coordinating controller sends a single "proceed" unicast message to the single triggered control device with the highest weighted signal.

Use of an independent coordinating controller to determine the best control device to handle a given speech command is preferred for any network types that do not allow individual device broadcasting or group multicasting. The optimistic method is more appropriate for systems sparsely populated with devices around a space, since very few "stop" messages will need to be sent by the coordinating controller. The pessimistic method is appropriate for densely populated devices in a space since only one "proceed" message will need to be sent by the coordinating controller. To compensate for network and device latency issues, a preferred embodiment allows the installer to configure the length of time each device waits for instructions from the coordinating controller before proceeding with its default behavior. It also allows the installer to configure how long a coordinating controller waits for additional weighted signals after receiving an initial weighted signal message from a triggered control device. Both waiting periods will typically be set between 25 and 250 milliseconds.

Figure 6:
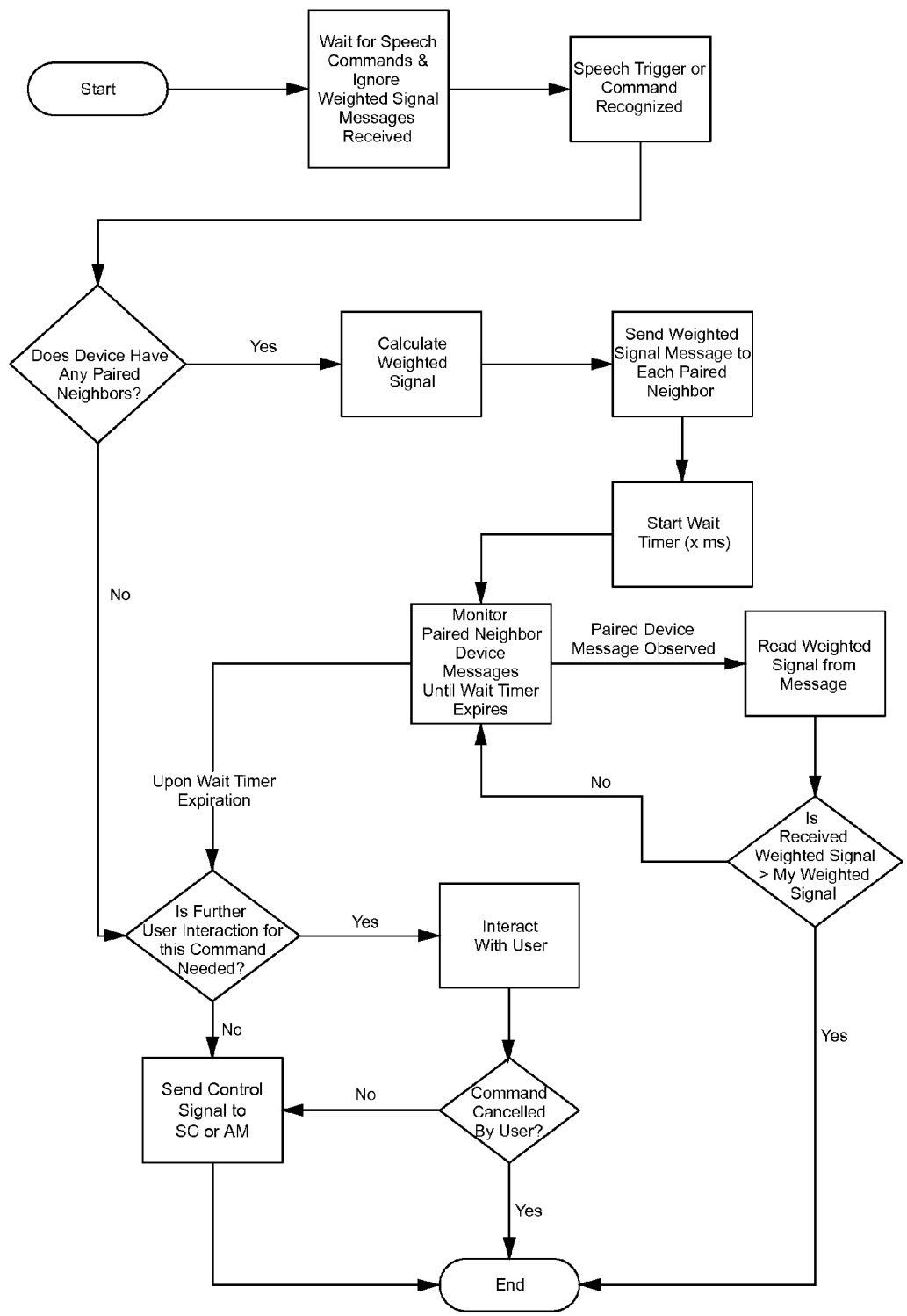
FIG. 6 is a flowchart illustrating an alternative method by which a plurality of paired neighboring FIG. 1 control devices that have simultaneously recognized the same speech command send their weighted signals to each other and collectively decide which one will further handle such speech command and interact with the system user.

FIG. 6 illustrates a high level flowchart for the Direct Neighbor Pairing method. This method requires that direct data connections (or "pairings") be preconfigured between all neighboring devices (e.g. devices that are at risk for experiencing the "duplicate response" problem if not coordinated). "Pairing" is a common term for linking two wireless devices together in software so that they are aware that the other exists and so that they can communicate directly with one another via radio waves. Bluetooth devices often utilize pairing techniques (e.g. a Bluetooth phone is paired with a Bluetooth headset). Referring again to FIG. 3., device W2 might need to be paired with devices T1, T2, W1, and W3 since these devices have some possibility of simultaneously recognizing a speech command that triggers W2. Device T2, however, given its central location in the living room, might need to be paired with devices W1, W2, W3, W4, T1, T3, and T5. When a hands-free speech command is recognized by a device with paired neighboring devices, the device first calculates a weighted signal as described above. It then directly sends messages containing its weighted signal to each of its paired neighbors. As schematically illustrated in FIG. 9 and FIG. 10, device pairing effectively links all neighboring interactive speech recognition control devices in a given space, allowing each device to send its weighted signal to each of its neighbors. Any neighboring devices that have also recognized the same speech command at that same instant will also be sending weighted signal messages to all of their respective paired neighbors. Those paired neighbors that did not recognize the same speech command at that same instant will simply ignore and clear any weighted signal messages they receive. For any device that did recognize a given speech command trigger, if any weighted signal message is received that exceeds the device's own weighted signal, the device immediately terminates processing and resumes waiting for a future speech command. If none of the paired neighbors sends a message containing a higher weighted signal to a triggered device when a predetermined waiting period expires (typically between 25 and 250 milliseconds), the device proceeds to interact with the user and process the speech command. This method is preferred for simple networks that lack controllers and broadcast messaging capabilities. It avoids the need for any centralized processing, is very fast and can be implemented without any formal network in place. Simple device-to-device pairing technologies such as BlueTooth, ZigBee RF4CE or Power line connections can be used to send messages between all paired neighboring devices in the Direct Neighbor Pairing method.

In FIG. 7, a building automation system S is schematically illustrated as comprising a plurality of the speech recognition devices (D1-D4) of the invention in combination with a coordinating controller CC of the type described above. The coordinating controller receives (wirelessly or via power line communication) the weighted signal messages WS from the control devices and, based on the respective values of these signals, selects one device to handle a speech command (or Trigger Phrase) heard by at least two control devices. This selection is implemented when the coordinating controller sends "stop" or "go" messages SG back to the triggered control devices (see the discussion of FIGS. 5A and 5B). In the system shown, each of the control devices can selectively transmit system control signals CS to a system controller SC that, in turn, controls the operation of various automated mechanisms (AM) that are operatively coupled therewith. Returning to FIG. 3, if person P4 walks into the kitchen and says a recognized trigger phrase such as "Hello Voice Control", devices T5, T6, W7 and W8 may all recognize the command. Each would immediately transmit their respective weighted signals to the coordinating controller CC (on FIG. 3. the coordinating controller might be implemented on controller C1). Since speech recognition device W8 is closest to the system user and there are no obstructions between the user and W8, it is likely that W8 will have the highest weighted signal and will therefore be chosen by the coordinating controller CC to handle the speech command. Devices T4, T5, and W7 will all disregard the just-recognized speech command and resume listening for new speech commands. W8 will immediately interact with person P4 (e.g. responding with "How may I help you?"). Once user interaction is completed (e.g. the user says "Lower thermostat two degrees"), device W8 will send appropriate control signals to a system controller SC (e.g. C1). The system controller will then send compatible instructions to thermostat Tstat1 telling it to lower its set point by two degrees.

In FIG. 8, a building automation system S' is schematically illustrated as comprising a plurality of the speech recognition devices (D1-D4) of the invention in combination with a coordinating controller CC of the type described above. As in FIG. 7, the coordinating controller receives (wirelessly or via power line communication) the weighted signal messages WS from the control devices and, based on the respective values of these signals, selects one device to handle a speech command (or Trigger Phrase) heard by at least two control devices. This selection is implemented when the coordinating controller sends "stop" or "go" messages SG back to the triggered control devices (see the discussion of FIGS. 5A and 5B). However, in this system, the control devices are shown as providing system control signals CS directly to the automated mechanisms AM. In the above example referencing person P4 on FIG. 3, after being selected by the coordinating controller CC and interacting with the person P4, device W8 sends a unicast message to thermostat Tstat1, instructing it to lower its set point by two degrees. No system controller is needed when employing system S'.

In the building automation system S" shown in FIG. 9, the control devices D1-D4 use either the Broadcast and Monitor method or Direct Neighbor Pairing method described above to send their respective weighted signals WS to each other, and the control devices collectively decide which one will handle a speech command that simultaneously triggered two or more devices. In system 5", any of the control devices can selectively transmit system control signals CS to a system controller SC that, in turn, controls the operation of various automated mechanisms (AM) that are operatively coupled therewith. In the above example referencing person P4 on FIG. 3, devices T4, T5, W7 and W8 would each calculate their respective weighted signals and then broadcast them to all control devices or send them to each of their paired neighbors. Each would then wait to receive weighted signal messages from other devices, comparing their own weighted signal to those received from other devices. Device W8 would not see any messages containing higher weighted signals, so it would proceed to interact with the user and handle the speech command. Devices T4, T5 and W7, upon receiving a higher weighted signal message, will each disregard the just-recognized speech command and resume listening for new speech commands. As in system S described above, W8 will ultimately send appropriate control signals to a system controller SC (e.g. C1). The system controller will then send compatible instructions to the automated mechanism AM (in this example Tstat1).

In the building automation system S''' shown in FIG. 10, the control devices D1-D4 use either the Broadcast and Monitor method or Direct Neighbor Pairing method described above to send their respective weighted signals WS to each other, and the control devices collectively decide which one will handle a speech command that simultaneously triggered two or more control devices. In this system, the control devices are shown as providing system control signals CS directly to the automated mechanisms AM. In the above example referencing person P4 on FIG. 3, devices T4, T5, W7 and W8 would each calculate their respective weighted signals and then broadcast them to all control devices or send them to each of their paired neighbors. Each would then wait to receive weighted signal messages from other devices, comparing their own weighted signals to those received from other devices. Device W8 would not see any messages containing higher weighted signals, so it would proceed to interact with the user and handle the speech command. Devices T4, T5 and W7, upon receiving a higher weighted signal message, will each disregard the just-recognized speech command and resume listening for new speech commands. As in system S' described above, W8 will ultimately send a unicast message to thermostat Tstat1, instructing it to lower its set point by two degrees. No system controller is needed when employing system S'''.

While all of the above device coordination techniques regarding the transmission and reception of weighted signals are illustrated using digital network terminology, an analog broadcast via RF, Power line, IR or other technologies can certainly be used to achieve the same result. Any digital or analog transmission method by which the equivalent of weighted signals can be transmitted between interactive speech recognition control devices or between such devices and a coordinating controller is considered to be part of this invention.

While each device's primary function is to implement coordinated hands-free control for a given space in a building, some desirable embodiments of this invention may incorporate or embed other useful functions for building automation. For example, this invention may be combined with or embedded into a thermostat, a button keypad, a remote control unit, a telephone, an intercom, an intelligent outlet plug and many other types of control devices and automated mechanisms.

For the in-wall embodiment of this invention (shown in FIG. 2B), it is particularly helpful to incorporate line voltage electrical load switching or light dimming within the device to create a "hybrid load control device". When adding speech control to existing buildings, any existing wall box electrical switch or light dimmer could be replaced by such a hybrid load control device. The hybrid load control device would add interactive speech control capabilities (and multi-device hands-free coordination using weighted signals) for the entire space while retaining the ability to control the local electrical/lighting load at the location where the hybrid load control device was installed. Thus, the need to increase the size of the electrical wall box to accommodate an in-wall speech recognizing control device is avoided. This hybrid load control device could have an identical face plate appearance as the device shown in FIG. 2B. However, as shown in FIG. 1. the device would embed light switching/dimming circuitry 50 that is operatively coupled to the device's microcontroller 10. Additional speech commands could be added to the device D's speech recognition vocabulary to allow the attached electrical or lighting load to be switched or dimmed "hands-free". Also, the physical push-to-talk button 24, up button 26 and down button 26' could be used to switch or dim the local electrical load (e.g. press and hold the talk button while using the up and down buttons to dim, brighten or toggle the light). Because each hybrid load control device would be operatively coupled to a building automation system via the device's two-way communications circuitry 18, the light switching and dimming circuitry 50 and attached electrical load inside the device becomes another automated mechanism AM that can be controlled by any operatively coupled external system controller or other automated mechanisms sending switching or dimming control signals CS to the hybrid load control device.

Another feature of the wireless interactive, speech recognition device of the invention is that it becomes a useful general purpose wireless room annunciator. At any time, a system controller can instruct a device D to play tones, music or prerecorded audio data. As noted above, the preferred device has on-board speech synthesis or text-to-speech (TTS) capabilities 22 that will allow a system controller or automated mechanism to instruct a device to "speak" any text sent to it using a computer-synthesized voice; (e.g., "A car has entered the driveway" or "Front Door Ajar" or "The outside temperature is 72 degrees").

As noted above, device D can communicate system control signals resulting from speech commands directly to controllers, electrical outlets, electronic equipment, machines and other automated mechanisms that provide compatible RF, power line or other communications and control capabilities. For those controllers and machines not supporting network or RF communications, an RF "base device" can be provided that receives the device's wireless output and sends it into the system controller's serial port, network port or to its network address using any wired or wireless protocol. In some cases, special software 'drivers' will be provided that reside in the system controller to facilitate easy two-way integration between control device D and the controller.

While the present invention is disclosed with reference to home automation systems and controllable electronic devices and appliances in which it is particularly useful, it will be appreciated that the invention is equally adapted for use with various other systems requiring hands-free control. For example, conference rooms, patient rooms, hotel rooms and commercial buildings may all benefit from a plurality of interactive speech recognition control devices working together to provide complete, comfortable and coordinated speech recognition coverage for a given space.

The invention has been described with reference to certain preferred embodiments. Clearly, variations can be made without departing from the spirit of the invention, and such variations are intended to fall within the scope of the appended claims.

What is claimed is:

1. An interactive, self-contained, speech recognition control device that is adapted for use in an automated building control system in which a plurality of functionally identical devices are positioned at different locations throughout a building space to enable a system user to control the actions of the system, via speech commands only, from various locations within the building space, as well as to enable such device to audibly interact with the system user, said device comprising a housing operatively supporting:
    (a) a microphone for converting spoken words, emanating from a system user located within said building space, to corresponding electrical signals;
    (b) a programmable microcontroller, operatively coupled to the microphone and comprising embedded software and circuitry serving to:
        (i) continuously monitor said electrical signals in order to recognize when a trigger phrase from an expected vocabulary has likely been spoken,
        (ii) produce a weighted signal having a value representing the quality of a just-recognized trigger phrase, and
        (iii) in the event the value of said weighted signal exceeds the respective values of all weighted signals produced by other devices located within said building space that have simultaneously recognized the same trigger phrase, produce audible user interactions and system control signals by which a desired effect, reflective of speech commands uttered by the system user and recognized by said device, is achieved within the building space by automated mechanisms that respond to said system control signals;
    (c) a transmitter operatively coupled to said microcontroller for selectively transmitting said weighted signal and said system control signals into said building space;
    (d) a receiver, operatively coupled to said microcontroller, for receiving (i) weighted signals emanating from one or more other functionally identical interactive speech recognition control devices within said building space, and/or (ii) coordination signal derived from said weighted signals by an independent coordinating controller; and
    (e) audio output circuitry through which said microcontroller can transmit audible sounds to interact with and provide indications of the system status to the system user.

2. The device as defined by claim 1 wherein said weighted signal incorporates one or more quantifiable measures representing the detected loudness of said trigger phrase and/or the estimated probability that said trigger phrase was correctly recognized by the embedded software of the microcontroller.

3. The device as defined by claim 1 wherein, upon said weighted signal being compared with all other weighted signals received from said other devices in said building space, if it is determined that the quality of a just-recognized trigger phrase received by said device is poorer than the quality of the same trigger phrase recognized simultaneously by said other devices, said device will immediately terminate further handling of said just-recognized trigger phrase.

4. The device as defined by claim 1 wherein, upon said weighted signal being compared with all other weighted signals produced by said other devices in said building space at the same time, if it is determined that the quality of a just-recognized trigger phrase received by said device is better than the quality of the same trigger phrase recognized simultaneously by said other devices, said device will proceed to respond to the system user.

5. The device as defined by claim 1 wherein the comparison of said weighted signals is performed collectively by said device and all other like devices within said building space that have simultaneously received and recognized the same trigger phrase.

6. The device as defined by claim 1 wherein the comparison of weighted signals is made by an independent coordinating controller to which said interactive speech recognition control device is operatively coupled in a multi-device system.

7. The device as defined by claim 1 wherein said comparison of weighted signals is made between the weighted signal produced by said device and a weighted signal produced by at least one other device within said space with which said device is paired.

8. The device as defined by claim 1 wherein said transmitter and receiver components transmit and receive said weighted signals and system control signals via radio-frequency (RF) signals.

9. The device as defined by claim 1 wherein said transmitter and receiver components transmit and receive said weighted signals and system control signals via a power line communication system.

10. The device as defined by claim 1 wherein said housing is adapted to be received by a standard electrical wall box.

11. The device as defined by claim 10 wherein said device further comprises electrical load control circuitry, mounted within said housing, for controlling and/or dimming electrical loads, lighting loads and power outlets, said electrical load control circuitry being operatively coupled to and controlled by said microcontroller.

12. An automated building control system comprising:
    a plurality of automated mechanisms that respond to predetermined system control signals to achieve a desired effect within a building space; and
    a plurality of functionally identical, interactive, self-contained, speech recognition control devices that are configured to be positioned at different locations throughout said building space to enable a system user to control the operation of said automated building control system, via speech commands only, from various locations within said building space, each of said control devices including a housing operatively supporting:
    (a) a microphone for converting spoken words, emanating from a system user located within said building space, to corresponding electrical signals;
    (b) a programmable microcontroller, operatively coupled to the microphone and comprising embedded software and circuitry serving to:
        (i) continuously monitor said electrical signals in order to recognize when a trigger phrase from an expected vocabulary has likely been spoken,
        (ii) produce a weighted signal having a value representing the quality of a just-recognized trigger phrase, and
        (iii) in the event the value of said weighted signal exceeds the respective values of all weighted signals produced by other devices located within said building space that have simultaneously recognized the same trigger phrase, produce audible user interactions and system control signals by which a desired effect, reflective of the speech commands uttered by the system user and recognized by said device, is achieved within the building space by automated mechanisms that respond to said system control signals;
(c) a transmitter operatively coupled to said microcontroller for selectively transmitting said weighted signal and said system control signals into said building space;
(d) a receiver, operatively coupled to said microcontroller, for receiving (i) weighted signals emanating from one or more other functionally identical interactive speech recognition control devices within said building space, and/or (ii) coordination signal derived from said weighted signals by an independent coordinating controller; and
(e) audio output circuitry through which said microcontroller can transmit audible sounds to interact with and provide indications of the system status to the system user;
each of the respective microcontrollers of said control devices operating to compare the respective values of weighted signals received from said other control devices with the value of the weighted signal it has produced to determine whether said microcontroller will produce any subsequent user interactions and said system control signals for transmission into said building space.

13. The system as defined by claim 12 wherein said weighted signal incorporates one or more quantifiable measures representing the detected loudness of said trigger phrase and/or the estimated probability that said trigger phrase was correctly recognized by the embedded software of the microcontroller.

14. The system as defined by claim 12 wherein, upon comparing said weighted signals, if a microcontroller determines that the value of the weighted signal it has produced is lower than the value of any one of the weighted signals received from said other control devices, said microcontroller will immediately terminate further handling of said trigger phrase.

15. The system as defined by claim 12 wherein, upon comparing said weighted signals, if a microcontroller determines that the value of the weighted signal it has produced is higher than the value of all other weighted signals it has received from said other control devices, said microcontroller will proceed to handle said trigger phrase by interacting with the system user and producing said system control signals.

16. The system as defined by claim 12 wherein the comparison of said weighted signals is performed collectively by all control devices within said building space that have simultaneously received and recognized the same trigger phrase.

17. The system as defined by claim 12 wherein said control signals are transmitted directly to said automated mechanisms.

18. The system as defined by claim 12 further comprising a system controller operatively coupled with each of said control devices and with each of said automated mechanisms, said system controller being configured to effect desired changes by said automated mechanisms in response to system control signals produced by any one of said control devices.

19. An automated building control system comprising:
a plurality of automated mechanisms that respond to predetermined system control signals to achieve a desired effect within a building space;
a plurality of functionally identical, interactive, self-contained, speech recognition control devices that are configured to be positioned at different locations throughout said building space to enable a system user to control the operation of automated building control system, via speech commands only, from various locations within said building space, each of said devices including a housing operatively supporting:
(a) a microphone for converting spoken words, emanating from a system user located within said building space, to corresponding electrical signals;
(b) a programmable microcontroller, operatively coupled to the microphone and comprising embedded software and circuitry serving to:
(i) continuously monitor said electrical signals in order to recognize when a trigger phrase from an expected vocabulary has likely been spoken,
(ii) produce a weighted signal having a value representing the quality of a just-recognized trigger phrase, and
(iii) in the event the value of said weighted signal exceeds the respective values of all weighted signals produced by other devices located within said building space that have simultaneously recognized the same trigger phrase, produce audible user interactions and system control signals by which a desired effect, reflective of the speech commands uttered by the system user and recognized by said device, is achieved within the building space by automated mechanisms that respond to said system control signals;
(c) a transmitter operatively coupled to said microcontroller for selectively transmitting said weighted signal and said system control signals into said building space;
(d) a receiver, operatively coupled to said microcontroller, for receiving (i) weighted signals emanating from one or more other functionally identical interactive speech recognition control devices within said building space, and/or (ii) coordination signal derived from said weighted signals by an independent coordinating controller; and
(e) audio output circuitry through which said microcontroller can transmit audible sounds to interact with and provide indications of the system status to the system user; and
(c) a coordinating controller being positioned within said building space and adapted to receive and compare the respective weighted signals produced by a plurality of control devices that have simultaneously recognized a given trigger phrase to determine which one of said plurality of control devices will control subsequent handling of said given trigger phrase, said coordinating controller being configured to transmit a signal to one or more of said control devices to implement that determination.

20. The system as defined by claim 19 wherein each of said control devices operates to await a predetermined time period after transmitting said weighted signal into said building space to receive said signal from said coordinating controller, and thereafter, return from a trigger phrase processing mode to a listening mode, and wherein said coordinating controller, upon determining which one of said plurality of control devices is to subsequently handle said given trigger phrase, transmits a signal, during said time period, to said one control device instructing it to proceed in responding to said given trigger phrase.

21. The system as defined by claim 19 wherein each of said control devices, after awaiting a predetermined time period after transmitting said weighted signal into said building space, proceeds to process said speech trigger phrase, and wherein said coordinating controller, upon determining which one of said plurality of control devices is to subsequently handle said given trigger phrase, transmits a signal to each of the other of said control devices, during said time period, instructing each not to proceed in handling said given trigger phrase.

22. The system as defined by claim 19 wherein said weighted signal incorporates one or more quantifiable measures representing the detected trigger phrase loudness and/or the estimated probability that the trigger phrase was correctly recognized by the embedded software of the microcontroller.

23. The system as defined by claim 19 wherein said control signals are transmitted directly to said automated mechanisms.

24. The system as defined by claim 19 further comprising a system controller operatively coupled with each of said control devices and with each of said automated mechanisms, said system controller being configured to effect desired changes by said automated mechanisms in response to system control signals produced by any one of said control devices.

* * * * *